March 24, 1953 T. H. FLOWERS 2,632,880

ELECTRIC PULSE MODULATOR

Filed Feb. 26, 1951 2 SHEETS--SHEET 1

INVENTOR,
Thomas H. Flowers,
BY Hall & Houghton,
ATTORNEYS.

ELECTRIC PULSE MODULATOR

Filed Feb. 26, 1951 2 SHEETS—SHEET 2

INVENTOR
Thomas H. Flowers,
BY Hall & Houghton,
ATTORNEYS.

Patented Mar. 24, 1953 2,632,880

UNITED STATES PATENT OFFICE 2,632,880

ELECTRIC PULSE MODULATOR

Thomas Harold Flowers, London, England

Application February 26, 1951, Serial No. 212,736
In Great Britain March 3, 1950

3 Claims. (Cl. 332—11)

Figures 1, 2:
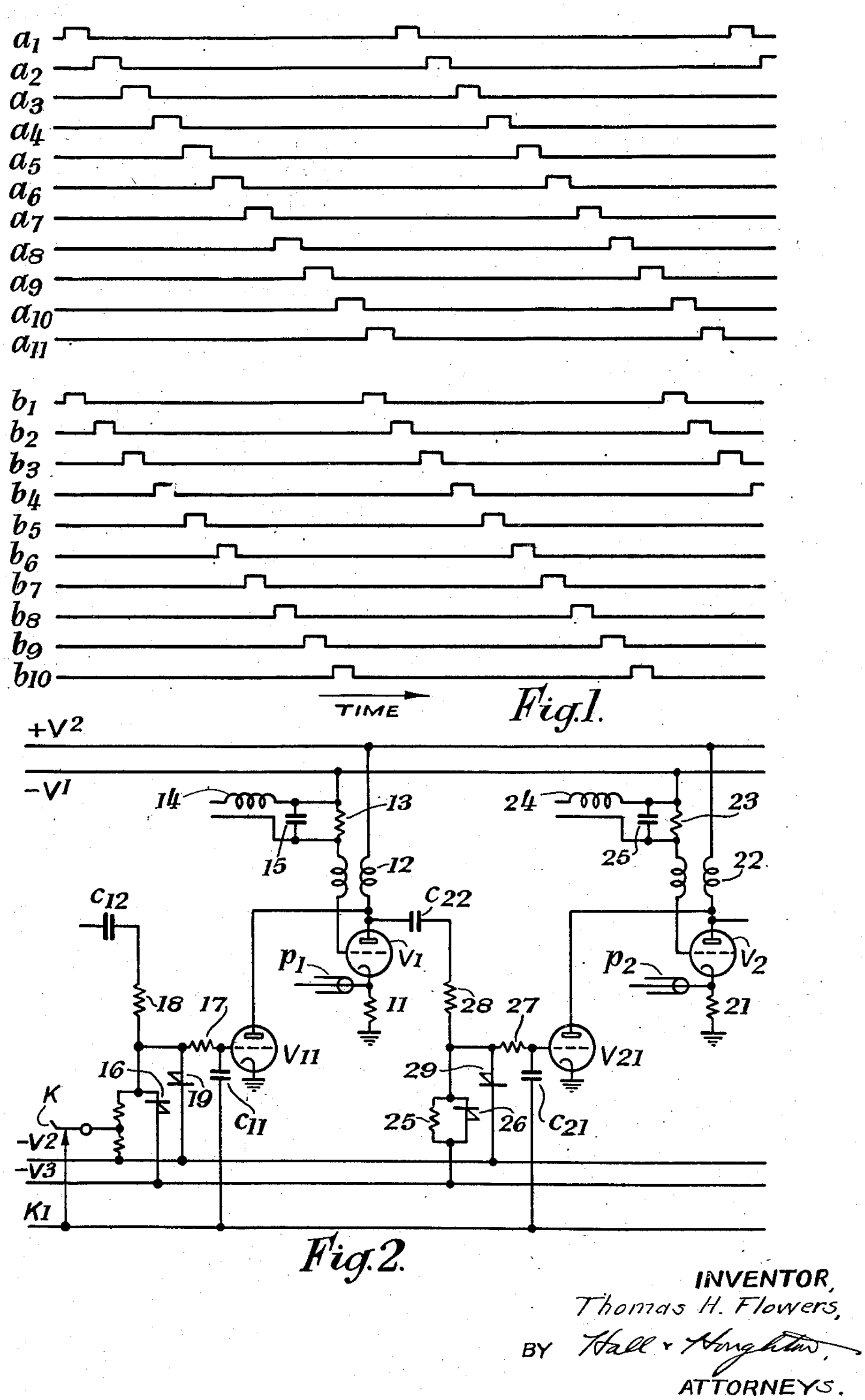

This invention relates to electric pulse modulators which place cyclically and in order a plurality of electrical communication channels in communication with a common multiplex channel. One of the objects of the invention is to reduce the number of, and to simplify the pulse sources which may be provided for such multiplex pulse modulators to modulate a given number of channels.

According to the present invention in an $n$-channel multiplex pulse modulator the number $n$ is the product of at least two integers which are prime to one another and the modulator comprises a plurality of groups of sources of pulses, one group for each of the integers, the number of sources of pulses in each group being equal to the value of the integer which the group represents, each pulse source having a pulse repetition frequency inversely proportional to the integer of the group of which the pulse source forms part, the trains of pulses of each group of pulse sources being time-spaced at equal intervals within the pulse repetition period of the group and the pulses in the different groups being synchronised so that when a pulse occurs in one group a pulse occurs simultaneously in all the groups.

In a particular application of the invention a multiplex pulse modulator comprises a plurality of stages of modulation, each stage except the last comprising at least two equal-sized groups of modulators each group of which is connected in tandem with a modulator of the next stage, while the last stage comprises a group of modulators connected to a common channel, the number of modulators in the groups in the several stages are prime to one another, a plurality of groups of sources of pulses are provided one group for each stage of the multiplex modulator, a group of sources of pulses comprising a plurality of pulse sources each connected to one modulator in each group of a stage and having a pulse repetition frequency inversely proportional to the number of modulators in the group, the trains of pulses of each group of pulse sources being time-spaced at equal intervals within the pulse repetition period of the group and the pulses synchronised to that when a pulse occurs in one group of pulses a pulse occurs simultaneously in all the groups of pulses.

In a further application of the invention an $n$-channel multiplex pulse modulator comprises $n$ modulators for placing $n$ channels in electrical communication in turn with a common channel, the number $n$ being the product of at least two integers which are prime to one another, a plurality of groups of sources of pulses one group for each of the integers, the number of sources of pulses in each group being equal to the value of the integer which the group represents, each pulse source having a pulse repetition frequency inversely proportional to the integer of the group of which the pulse source forms part, the trains of pulses of each group of pulse sources being time-spaced at equal intervals within the pulse repetition period of the group and the pulses being synchronised so that when a pulse occurs in one group a pulse occurs simultaneously in all the groups, and each modulator is connected to a unique combination of pulse sources comprising one pulse source in each group of pulse sources, and places its channel in electrical communication with the common channel on the simultaneous occurrence of a pulse from each of the pulse sources to which it is connected.

In order that the invention may be more clearly understood and readily carried into effect, alternative applications thereof will now be described in greater detail by way of example, with reference to the accompanying drawings in which—

Figure 3:
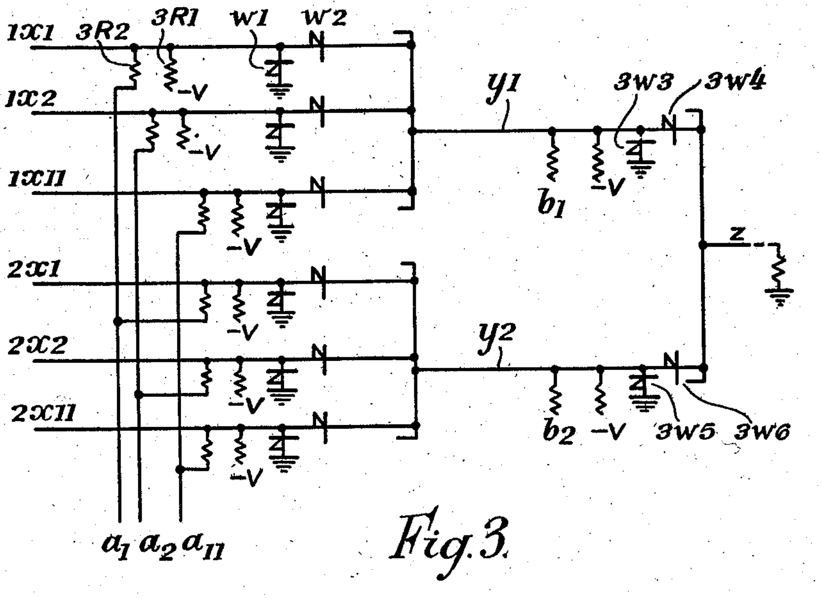
Figure 4:
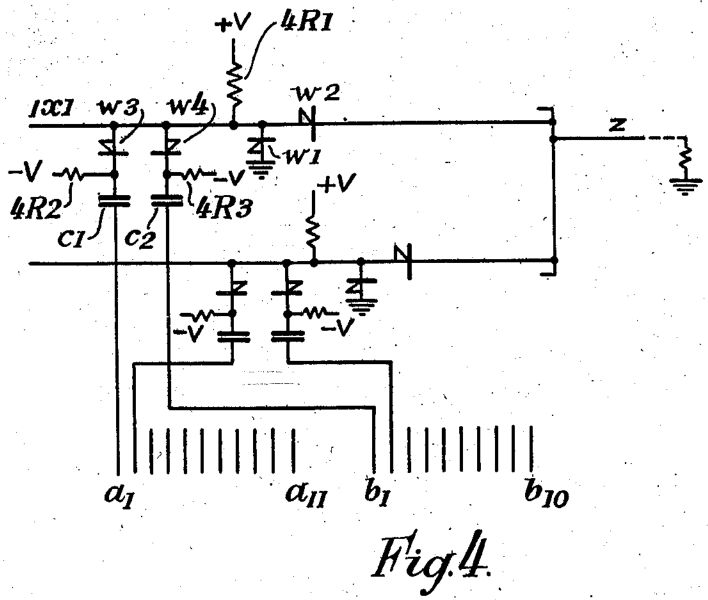

Fig. 1 shows one form of pulse groups suitable for use in carrying out the invention, Fig. 2 is a part of a circuit for generating such pulse groups given by way of example and not forming part of the present invention and Figs. 3 and 4 are partial circuit arrangements of alternative modulating arrangements embodying the invention.

Referring to Fig. 1, two groups of sets of pulses, which for convenience will be referred to as pulse sources as used in carrying out the invention are illustrated, one group along lines $a1$ to $a11$ and the other group along lines $b1$ to $b10$. One group comprises eleven and the other ten pulse sources which numbers are prime to one another. The pulse sources are suitable, as will be explained hereafter, for a 110-channel multiplex pulse modulator, the number 110 being the product of the two numbers 11 and 10. The pulse repetition frequency of the pulses $a1$ to $a11$ is $fo/11$ where $fo$ is a suitable base frequency and the trains of pulses from each source are time-spaced in order at intervals of $1/fo$, i. e. the period of the base frequency, and are thus equally time-spaced within the pulse repetition period. The pulse repetition frequency of the pulses $b1$ to $b10$ is $fo/10$ where $fo$ is the same base frequency as that of the pulses $a1$ to $a11$, and the trains of pulses from each source are time-spaced in order at intervals of $1/fo$, i. e.

the same time spacing as the pulses $a1$ to $a11$. The pulses from the two groups are synchronised so that when a pulse occurs in one group a pulse occurs simultaneously in the other group. The widths of the pulses may be any suitable value up to the value of the time-spacing of the pulses i. e. up to $1/fo$.

Circuit arrangements or devices providing groups of pulses as illustrated in Fig. 1 may take any convenient form, but one arrangement which may be used with advantage although as previously stated, not forming part of the present invention per se, will be described with reference to Fig. 2.

Referring to Fig. 2, valve V1 is part of a blocking oscillator pulse generator which, when suitably controlled, generates a voltage pulse across resistor 11 connected between the cathode of the valve V1 and earth, which voltage is shown in the diagram as applied to a coaxial pulse lead $p1$. The anode of valve V1 is connected via the primary winding of a transformer 12 to a suitable potential +V2 positive with respect to earth potential. The control grid of valve V1 is connected through the secondary winding of transformer 12 in series with the parallel combination of a resistor 13, an electrical delay line 14 and a condenser 15 to a source of negative potential —V1 of value sufficient and preferably slightly more than just sufficient when applied to the control grid, to cut-off the anode current of the valve V1. The delay line 14 is open-circuited at its end remote from the resistor 13 and condenser 15 and has a delay time equal to half the duration of the pulse which the pulse generator is required to generate. Let it be supposed that the circuit so far described has reached steady state condition with the valve V1 in the anode current cut-off state. Then it is well known that if anode current is started by some external means, it is augmented by the feed-back to the control grid of the potential of which rapidly becomes such that grid current flows and a large total cathode current is caused to flow. This cathode current produces a positive voltage across the impedances in the cathode circuit. The grid current produces a steep-fronted voltage rise into the delay line 14. Reflection of the voltage at the open-end of the delay line causes a negative voltage to be applied to the control grid of valve V1 through the secondary winding of transformer 12 at a time equal to twice the delay time of the delay line after the initial rise of current in the valve. The negative voltage is again augmented by the feed-back to the control grid and the valve V1 rapidly returns to the anode cut-off condition, thus completing the generation of a pulse in its cathode circuit. The valve is then blocked against further operation until the energy in the magnetic circuit of the transformer 12, the capacitor 15 and delay line 14 have been substantially dissipated.

In the case of a pulse group generator for use in carrying out the present invention, blocking oscillator pulse generators equal in number to the number of pulses in the group may be provided and operated in order from a source of pulses of the required base frequency connected to lead K1. In Fig. 2 a second blocking oscillator pulse generator is shown comprising valve V2, and components similar to those associated with valve V1 are similarly designated except that the first numeral of each designation is 2 instead of 1. The operation of each blocking oscillator pulse generator in turn from the base frequency pulses, which for convenience will be designated K1, will now be described.

The anode of valve V1 is connected to the anode of a valve V11 of which the anode current is normally cut-off. Let it be supposed that the valve V11 is caused to conduct by a K1 pulse. The transformer 12 causes the anode current in valve V11 to produce a positive voltage to be applied to the control grid of valve V1, which then conducts on its anode circuit. A positive pulse is then produced in the cathode circuit and communicated to the lead $p1$ and a negative pulse is produced in the anode circuit of valve V1 as already described. The negative pulse at the anode of valve V1 is caused to prepare the operation of the blocking oscillator comprising valve V2 in response to the K1 pulse following the K1 pulse which caused the operation of the blocking oscillator comprising valve V1, as will now be described.

Valve V21 has its anode connected to the anode of valve V2 and its cathode connected to earth. Its anode current is normally cut off as will be clear later and when made to flow causes the blocking oscillator comprising valve V2 to generate a pulse over lead $p2$ in a similar manner to that described for the generation of a pulse over lead $p1$ in response to anode current flow in valve V11. The K1 pulses have an amplitude approximately equal to the grid base of valve V21 and are communicated to the control grid via condenser C21. The mean value of the control grid potential is, however, controlled so that in the steady state, the control grid potential is never positive enough to cause anode current to flow. The mean value of the grid potential in the steady state is substantially that of the negative bias potential —V3 which is applied via the parallel connected resistor 25 and rectifier 26 in series with resistor 27 to the control grid. The junction of the resistors 25 and 27 is connected via resistor 28 and condenser C22 to the anode of valve V1.

When a negative-going pulse is produced at the anode of valve V1 as already described, the condenser C22 charges during the negative excursion of the anode voltage so that its plate connected to the anode is negative with respect to its other plate. The charging is assisted by the rectifier 26 which effectively short-circuits the resistor 25 at this time. When the anode voltage returns to normal at the end of the pulse, the charge on condenser C22 is discharged through resistor 28 and raises the potential of the junction of resistors 28, 27 and 25 to the potential —V2 at which it is clamped by the rectifier 29. Potential —V2 is approximately the control grid potential of valve V21 at which anode current cut-off occurs. This potential is applied via resistor 27 to the control grid and when a K1 pulse via condenser C21 is superimposed on this potential, the valve V21 conducts and causes the blocking oscillator pulse generator comprising V2 to generate a pulse similarly to that previously described for the blocking oscillator comprising valve V1. It was assumed that a K1 pulse caused the valve V11 to conduct and it has been described how when valve V11 is caused to conduct, pulses are generated at the cathode and anode of valve V1 and at the conclusion of the pulses the control grid potential of valve V21 is raised to a value at which a superimposed K1 pulse will cause that valve to conduct.

The duration of the K1 pulses is arranged to be less than that of the pulses generated by the blocking oscillators. Hence, when the discharge of condenser C22 raises the control grid potential of the valve V21, it does so after the K1 pulse which operated valve V11 has ceased. The capacitance of the condenser C22 and the constants of the network comprising resistors 28, 25 and potential holding rectifier 29 are chosen so that the discharge of condenser C22 raises the potential of the control grid of valve V21 for a period long enough for that valve to be rendered conducting by at least one K1 pulse following the K1 pulse which rendered valve V11 conducting but preferably for not more than one or two such K1 pulses. A pulse thus produced over lead p1 in response to one K1 pulse will thus be followed by a pulse over lead p2 in response to the next K1 pulse and it will be apparent that further blocking oscillator pulse generators in chain connection following that comprising valve V2 will generate pulses in response to successive K1 pulses. If, valve V21, for example, is caused to conduct by two successive K1 pulses, only the first will be successful in pulsing valve V2 because of the blocked period which follows the generation of a pulse.

Let it be assumed that the chain of blocking oscillators is closed in a ring and that one of them is caused to be operated by a K1 pulse, then it will be apparent that the blocking oscillators will be operated in order by the K1 pulses and provided that the ring contains the appropriate number of blocking oscillators, the pulses produced on their p leads will be a group of pulses as shown in Figure 1, for the group a1 to a11 or b1 to b10. It is necessary, however, that the pulse generation be started for example by causing valve V11 to conduct. This is accomplished by operating the key K to open its contact and thus to raise the mean potential of the control grid of valve V11 to the potential —V2 and permitting K1 pulses to operate that valve. The blocking oscillator comprising valve V1 will then generate pulses spaced apart by the blocked time of the oscillator, and these will circulate round the ring as previously described, and more than one pulse will be caused to start circulating.

The continued circulation of more than one pulse round the ring may be prevented by arranging the blocked time after the generation of a pulse by a blocking oscillator to exceed half the period of the ring cycle of operations although the time must of course be less than the said period. The blocked time may be controlled by a condenser, for example condenser 15, for the blocking oscillator comprising valve V1.

It will be seen that if a plurality of rings of blocking oscillators as described are provided each with an appropriate number of blocking oscillators in the ring and all the rings are driven from the same K1 pulse source, groups of pulses as required in carrying out the present invention and as illustrated by way of example in Fig. 1 may be produced.

A particular application of the invention to a 110-channel 2-stage multiplex modulator is illustrated in Fig. 3. The modulators illustrated are fully described in the specification of copending patent application S. No. 191,584 filed October 23, 1950 by Thomas Harold Flowers and John Edward Flood and are therefore only briefly described in this specification.

The 110-channels are divided into ten groups each of eleven channels and each channel is connected to a modulator of which ten groups each of eleven modulators are provided. For the sake of clearness of the figure only six channels and their first stage modulators are shown. Channels 1x1, 1x2, 1x11 are the first, second and eleventh channels of the first group, and channels 2x1, 2x2 and 2x11 the first, second and eleventh channels of the second group. The remaining channels not shown will be readily appreciated. All the modulators are similar and only that connected to channel 1x1 will be described in detail. The modulator comprises two rectifiers W1 and W2 in series and of the same polarity in the series connection. The channel 1x1 is connected to the junction of the two rectifiers, the other side of rectifier W1 is connected to earth and the other side of rectifier W2 to a group channel y1. The junction of the two rectifiers is supplied with bias current via a resistor 3R1 from a D. C. potential —V negative with respect to earth and pulse current via a resistor 3R2 from a pulse source a1. The pulse source a1 is one of eleven sources, a1, a2, . . . a11 as described and illustrated with reference to Fig. 1. The bias and pulse currents are arranged so that in the absence of a pulse from source a1 current flows through rectifier W1 in its low resistance direction of conduction but in the presence of a pulse current flows through rectifier W2 in its low resistance direction of conduction and connects the channel 1x1 to the common y1. Each modulator in group 1 is connected to a different one of the pulse sources a1 to a11. Hence each channel 1x1 to 1x11 is connected in turn to the common y1. Similarly each channel 2x1 to 2x11 is connected in turn to the common y2 and so on for each of the ten groups. A pulse in any one of the pulse sources a1 to a11 thus connects one channel in each group to a common y channel, and the second stage of modulation connects one of the channels to the common multiplex channel z as will now be explained.

The common y channel of each first group of modulators is connected through a second stage modulator to the common multiplex channel z. A second stage modulator is similar to the first stage modulators in that it comprises two rectifiers, 3W3 and 3W4 in the case of the common channel y1 and 3W5 and 3W6 in the case of the common channel y2, a source of D. C. bias —V and a pulse source e. g. b1, b2, and the series rectifier conducts in its low resistance direction only in the presence of an impulse from the pulse source. The pulse sources b1 to b10 are provided as described and illustrated with reference to Fig. 1 and the ten second stage modulators are connected one to each of the pulse sources. It is thus apparent that although a pulse from one of the sources a1 to a11 connects one channel in each first stage group to a common y-channel only that channel which is connected to the y common which is simultaneously connected to the z common channel by a pulse from a source b1 to b9 will be connected to the z channel. It will be further apparent that each of the 110-channels will be connected in turn in cyclic order to the multiplex channel because the number of channels in the first stage groups is prime to the number of channels in the second stage.

In the further application of the invention shown in Fig. 4 110 channels are multiplexed to a common channel in one stage of 110 modulators, of which two only are shown in the figure. The modulators are all similar and only one will be described. Each comprises two rectifiers W1 and W2 in series connection and the same polarity in the series connection. The channel, 1x1 in this case, is connected to the junction of the two rectifiers, the other side of rectifier W1 is connected to earth and the other side of rectifier W2 is connected to the common multiplex channel z. The rectifiers are biased from three sources, through a resistor 4R1 from a potential +V positive with respect to earth through a resistor 4R2 and rectifier W3 in series from a potential −V negative with respect to earth and, through a resistor 4R3 and rectifier W4 in series from the potential −V. The bias currents are arranged so that current from source −V through either or both rectifiers W3 or W4 produces current through rectifier W1 in its low resistance direction of conduction, but with current through neither rectifier W3 nor W4, bias current from source +V produces current through rectifier W2 in its low resistance direction of conduction and connects the channel 1x1 to the common multiplex channel z.

Pulse sources a1 to a11 and b1 to b10 are provided as described and illustrated with reference to Fig. 1 except that in this example negative pulses are required from the pulse sources. The polarities of the pulses shown in Fig. 1 may be reversed by transformers. The junction of resistor 4R2 and rectifier W3 is connected via a condenser C1 to one of the pulse sources in the a1 to a11 group, connection to a1 being shown in the drawing. The junction of resistor 4R3 and rectifier W4 is connected via a condenser C2 to one of the pulse sources in the b1 to b10 group, connection to b1 being shown in the drawing. The amplitude of a pulse from source a1 is arranged to be such that rectifier W3 is rendered a high-resistance, and similarly a pulse from source b1 renders rectifier W4 a high-resistance. From the previously described conditions for connection of the channel 1x1 to the common multiplex channel z it will be seen that this connection occurs only on the simultaneous occurrence of a pulse from the sources a1 and b1. It will be further apparent because of the prime number relationship between the number of pulse sources in the two groups of pulse sources, by connecting each of the 110 modulators to a different combination of one pulse source in each group of pulse sources, each of the 110 channels may be connected in cyclic order to the common multiplex channel.

Examples have been described of 110-channels modulators which may be operated from 21 pulse sources in two groups one of eleven and the other of ten derived in simple manner from a common base frequency. Other arrangements will be apparent; for example, fifteen sources of pulses in three groups of seven five and three pulse sources respectively may be provided for a 105-channel multiplex in three stages in series, or in one stage using combinations of the pulses, or in two stages in series one of the stages using combinations of pulses from two of the groups of pulses.

I claim:

1. A multiplex pulse modulator comprising a plurality of stages of modulation, each stage except the last comprising at least two equal-sized groups of modulators each group of which is connected in tandem with a modulator of the next stage, while the last stage comprises a group of modulators connected to a common channel, the number of modulators in the groups in the several stages being prime to one another, a plurality of groups of sources of pulses, one group of said plurality of groups being provided for each stage of the multiplex modulator, a group of sources of pulses comprising a plurality of pulse sources each connected to one modulator in each group of a stage and having a pulse repetition frequency inversely proportioned to the number of modulators in the stage, the trains of pulses of each group of pulse sources being time-spaced at equal intervals within the pulse repetition period of the group and the pulses synchronised so that when a pulse occurs in one group of pulses a pulse occurs simultaneously in all the groups of pulses.

2. A multi-channel multiplex modulator comprising in combination $n$ channels, $n$ being the product of at least two integers which are prime to one another, $n$ pulse modulators each of which is connected to one of said channels, groups of pulse sources, one group for each of said integers, the number of pulse sources in each group being equal to the value of the integer which the group represents, each pulse source having a pulse repetition rate inversely proportional to the integer represented by the group of which the pulse source forms part, the trains of pulses of each group of pulse sources being time spaced at equal intervals within the pulse repetition period of the group and the pulses in different groups being synchronised so that when a pulse occurs in one group a pulse occurs simultaneously in all the groups.

3. A multi-channel pulse modulator comprising in combination $n$ channels, $n$ being the product of at least two integers which are prime to one another, $n$ modulators each of which is connected to one of said channels, a common channel to which said modulators are connected, a plurality of groups of pulse sources, one group for each of said integers, each group containing a number of pulse sources equal to the value of the integer which the group represents, each pulse source having a pulse repetition frequency inversely proportional to the integer of the group of which the pulse source forms part, the trains of pulses from each group of pulse sources being time-spaced at equal intervals within the pulse repetition period of the group and the pulses being synchronised so that when a pulse occurs in one group a pulse occurs simultaneously in all the groups, each modulator being connected to a unique combination of pulse sources comprising one pulse source in each group of pulse sources and which places its channel in electrical communication with the common channel on the simultaneous occurrence of a pulse from each of the pulse sources to which it is connected.

THOMAS HAROLD FLOWERS.

REFERENCES CITED

The following references are of record in the file of this patent:

UNITED STATES PATENTS

| Number | Name | Date |
|---|---|---|
| 2,556,200 | Lesti | June 12, 1951 |